(12) United States Patent
Chen et al.

(10) Patent No.: US 10,581,369 B2
(45) Date of Patent: Mar. 3, 2020

(54) MOTOR CONTROLLER

(71) Applicant: SUNGROW POWER SUPPLY CO., LTD., Anhui (CN)

(72) Inventors: Wenjie Chen, Anhui (CN); Enli Du, Anhui (CN); Anbo Yu, Anhui (CN); Han Yang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 16/239,072

(22) Filed: Jan. 3, 2019

(65) Prior Publication Data

US 2019/0372505 A1 Dec. 5, 2019

(30) Foreign Application Priority Data

Jun. 1, 2018 (CN) .......................... 2018 1 0557905

(51) Int. Cl.
*H02P 29/024* (2016.01)
*H02P 6/17* (2016.01)
(Continued)

(52) U.S. Cl.
CPC .......... *H02P 29/0241* (2016.02); *H02P 6/085* (2013.01); *H02P 6/12* (2013.01); *H02P 6/17* (2016.02)

(58) Field of Classification Search
CPC .......... H02P 29/0241; H02P 6/12; H02P 6/17; H02P 6/085
(Continued)

(56) References Cited

U.S. PATENT DOCUMENTS 6,420,847 B1 * 7/2002 Galbiati .................. H02P 6/182
                                                         318/400.33
9,673,744 B2    6/2017 Eberlein et al.
(Continued)

FOREIGN PATENT DOCUMENTS

CN    103733508 A    4/2014
CN    203775095 U    8/2014
(Continued)

OTHER PUBLICATIONS

Extended European Search Report regarding European Application No. 18214878.3 dated Mar. 15, 2019.
(Continued)

*Primary Examiner* — David Luo
(74) *Attorney, Agent, or Firm* — Harness, Dickey & Pierce, P.L.C.

(57) ABSTRACT

A motor controller according to the present disclosure obtains the rotational speed determination signal of the motor through the microprocessor and the rotational speed collector, and then outputs the first control signal by the first logic operation circuit based on the speed of the motor, to make the driving circuit control the main circuit to work normally or enter the safety state. In addition, the motor controller generates and outputs the second shutoff signal by the monitoring chip based on the working state or the output instruction of the microprocessor, and then outputs the second control signal by the second logic operation circuit based on the second shutoff signal and whether the DC bus voltage of the main circuit is in an overvoltage state, to make the driving circuit control the main circuit to stop receiving the first control signal and enter the safety state.

10 Claims, 3 Drawing Sheets

(51) Int. Cl.
*H02P 6/08* (2016.01)
*H02P 6/12* (2006.01)

(58) Field of Classification Search
USPC .................. 318/400.22, 400.21, 400.01, 700
See application file for complete search history.

(56) References Cited

U.S. PATENT DOCUMENTS

| | | |
|---|---|---|
| 10,351,002 B2 | 7/2019 | Saha et al. |
| 2003/0202298 A1 | 10/2003 | Tamaki et al. |
| 2014/0191700 A1 | 7/2014 | Eberlein et al. |
| 2017/0305274 A1 | 10/2017 | Saha et al. |
| 2017/0353140 A1 | 12/2017 | Baburajan et al. |

FOREIGN PATENT DOCUMENTS

| | | |
|---|---|---|
| CN | 105680417 A | 6/2016 |
| CN | 104442405 B | 9/2016 |
| CN | 106877784 A | 6/2017 |
| CN | 107112937 A | 8/2017 |

OTHER PUBLICATIONS

First Chinese Office Action regarding Application No. 201810557905.7 dated Jul. 26, 2019. Translation provided by Unitalen Attorneys at Law.

\* cited by examiner

MOTOR CONTROLLER

CROSS REFERENCE TO RELATED APPLICATION

The present application claims priority to Chinese Patent Application No. 201810557905.7, titled "MOTOR CONTROLLER", filed on Jun. 1, 2018 with the Chinese Patent Office, which is incorporated herein by reference in its entirety.

FIELD

The present disclosure relates to the technical field of motor control, and particularly to a motor controller.

BACKGROUND

A main function of a motor controller in a pure electric vehicle or a hybrid vehicle is to convert the direct current power provided by the high-voltage battery into three-phase alternating current power required by a motor, and drive the motor under the control of the vehicle controller, to provide driving or braking torque for the vehicle.

At present, functional safety is required for the motor controller applied to a pure electric or hybrid passenger vehicle. Generally, the motor controller with the functional safety requirement is required to enter a safety state by a shutoff path when detecting a failure against the safety goal, thereby avoiding hazards to the driver and passengers. The safety state of the motor controller generally means that the output torque of the motor controlled by the controller is approximately zero, which will not cause uncontrollable acceleration or deceleration of the vehicle. At present, there are mainly two types of safety states, namely, an active short circuit state and a bridge arms all shutoff state, which have advantages and disadvantages under conditions of low speed and high speed. A reasonable solution is to enter the bridge arms all shutoff state under condition of low speed, and enter the active short circuit state under condition of high speed. In this solution, the shutoff path of the motor controller for entering the safety state is to determine whether the motor speed is in a low speed zone or a high speed zone by collecting a motor speed signal, and then generate a shutoff state control signal according to the determination result, so as to perform the control operation to enter the bridge arms all shutoff state or the active short circuit state.

In the solution of the conventional technology, since the shutoff path is required to have a high safety level, the requirement on the failure rate of each device (a microprocessor or a logic operation circuit) involved in the above shutoff path in the motor controller is relatively high, which results in a high difficulty on designing the device.

SUMMARY

A motor controller is provided according to embodiments of the present disclosure, to solve the technical problem of high difficulty in designing a device in the conventional technology.

In order to achieve the above object, the following technical solutions are provided according to the present disclosure.

A motor controller includes: a main circuit, a rotational speed collector, a microprocessor, a monitoring chip, a first logic operation circuit, a second logic operation circuit, an overvoltage detection circuit and a driving circuit.

The microprocessor is configured to output an initial pulse width modulation (PWM) signal and a first shutoff signal, and generate a rotational speed determination signal based on a motor rotational speed signal outputted by the rotational speed collector.

The first logic operation circuit is configured to generate a first control signal based on the initial PWM signal, the first shutoff signal and the rotational speed determination signal.

The monitoring chip is configured to monitor a working state of the microprocessor, and generate and output a second shutoff signal based on the working state or an output instruction of the microprocessor.

The second logic operation circuit is configured to generate a second control signal based on the second shutoff signal and a DC bus overvoltage signal of the main circuit outputted by the overvoltage detection circuit.

The driving circuit is configured to control the main circuit to work normally or enter a one of a first and a second safety state in response to the first control signal, and control the main circuit to stop receiving the first control signal and enter one of the first safety state and the second safety state in response to the second control signal.

In an embodiment, the second control signal may include an enable signal and a state selection signal.

The enable signal may be used to control the main circuit to stop receiving the first control signal.

The state selection signal may be used to control the main circuit to enter one of the first safety state and the second safety state.

In an embodiment, the second logic operation circuit may be configured to:

generate the enable signal based on the second shutoff signal; and generate the state selection signal based on the DC bus overvoltage signal, wherein, if the DC bus overvoltage signal indicates that a DC bus of the main circuit is in an overvoltage state, the state selection signal is used to control the main circuit to enter the first safety state; if the DC bus overvoltage signal indicates that the DC bus of the main circuit is in a non-overvoltage state, the state selection signal is used to control the main circuit to enter the second safety state, wherein the first safety state is an active short circuit state, and the second safety state is a bridge arms all shutoff state.

In an embodiment, the driving circuit may include three driving units, each of the driving units may include: an upper transistor selection switch, a lower transistor selection switch, an upper transistor driving sub-circuit and a lower transistor driving sub-circuit.

A control end of the upper transistor selection switch and a control end of the lower transistor selection switch may both receive the enable signal.

A fixed contact of the upper transistor selection switch may be connected to an input end of the upper transistor driving sub-circuit.

A fixed contact of the lower transistor selection switch may be connected to an input end of the lower transistor driving sub-circuit.

A normally closed contact of the upper transistor selection switch may receive an upper transistor modulation signal in the first control signal.

A normally closed contact of the lower transistor selection switch may receive a lower transistor modulation signal in the first control signal.

A normally open contact of the upper transistor selection switch may receive a grounded signal.

A normally open contact of the lower transistor selection switch may receive the state selection signal.

An output end of the upper transistor driving sub-circuit may be connected to a upper transistor control end in the main circuit.

An output end of the lower transistor driving sub-circuit may be connected to a lower transistor control end in the main circuit.

In an embodiment, the upper transistor driving sub-circuit may include: an upper transistor driving isolation amplifier, a first resistor and a second resistor.

An input end of the upper transistor driving isolation amplifier may be an input end of the upper transistor driving sub-circuit.

An output end of the upper transistor driving isolation amplifier may be respectively connected to one end of the first resistor and one end of the second resistor.

The other end of the first resistor may be connected to the other end of the second resistor at a connection point which serves as the output end of the upper transistor driving sub-circuit.

In an embodiment, the lower transistor driving sub-circuit may include: a lower transistor driving isolation amplifier, a third resistor and a fourth resistor.

An input end of the lower transistor driving isolation amplifier may be the input end of the lower transistor driving sub-circuit.

An output end of the lower transistor driving isolation amplifier may be connected to one end of the third resistor and one end of the fourth resistor.

The other end of the third resistor may be connected to the other end of the fourth resistor at a connection point which serves as the output end of the lower transistor driving sub-circuit.

In an embodiment, the grounded signal may be received from one end of a fifth resistor, the other end of the fifth resistor may be grounded.

In an embodiment, the monitoring chip may be specifically configured to:

generate and output the second shutoff signal when the working state of the microprocessor is a fault state, or the output instruction of the microprocessor is a shutoff instruction.

In an embodiment, an input end of the rotational speed collector may be connected to an output end of a motor speed sensor.

In an embodiment, the overvoltage detection circuit may include: a voltage collector, an isolation operational amplifier and a sampling voltage comparator.

An input end of the voltage collector may be connected to two ends of a DC bus capacitor in the main circuit.

An output end of the voltage collector may be connected to an input end of the isolation operational amplification.

An output end of the isolation operational amplifier may be connected to a non-inverting input end of the sampling voltage comparator.

An inverting input end of the sampling voltage comparator may receive a reference voltage.

An output end of the sampling voltage comparator may output the DC bus overvoltage signal.

The motor controller according to the present disclosure obtains the rotational speed determination signal of the motor through the microprocessor and the rotational speed collector, and then outputs the first control signal by the first logic operation circuit based on the speed of the motor, to make the driving circuit control the main circuit to work normally or enter the safety state, so as to realize a shutoff path. In addition, the motor controller generates and outputs the second shutoff signal by the monitoring chip based on the working state or the output instruction of the microprocessor, and then outputs the second control signal by the second logic operation circuit based on the second shutoff signal and whether the DC bus voltage of the main circuit is in an overvoltage state, to make the driving circuit control the main circuit to stop receiving the first control signal and enter the safety state, so as to realize another shutoff path. That is, two independent shutoff paths are designed in the present disclosure, and thus can achieve safety level decomposition, which reduces the safety level requirement on each shutoff path, thereby reducing the difficulty in design a device.

BRIEF DESCRIPTION OF THE DRAWINGS

For explaining technical solutions according to embodiments of the disclosure more clearly, drawings used in the illustration of the embodiments of the disclosure are described briefly. Apparently, the drawings in the following description are merely some of the embodiments of the disclosure, and other drawings may be obtained based on the drawings by those skilled in the art without creative efforts.

DETAILED DESCRIPTION OF THE EMBODIMENTS

The technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the scope of the present disclosure.

A motor controller is provided according to the embodiments of the present disclosure, to solve the technical problem of high difficulty on designing a device in the conventional technology.

Figure 1:
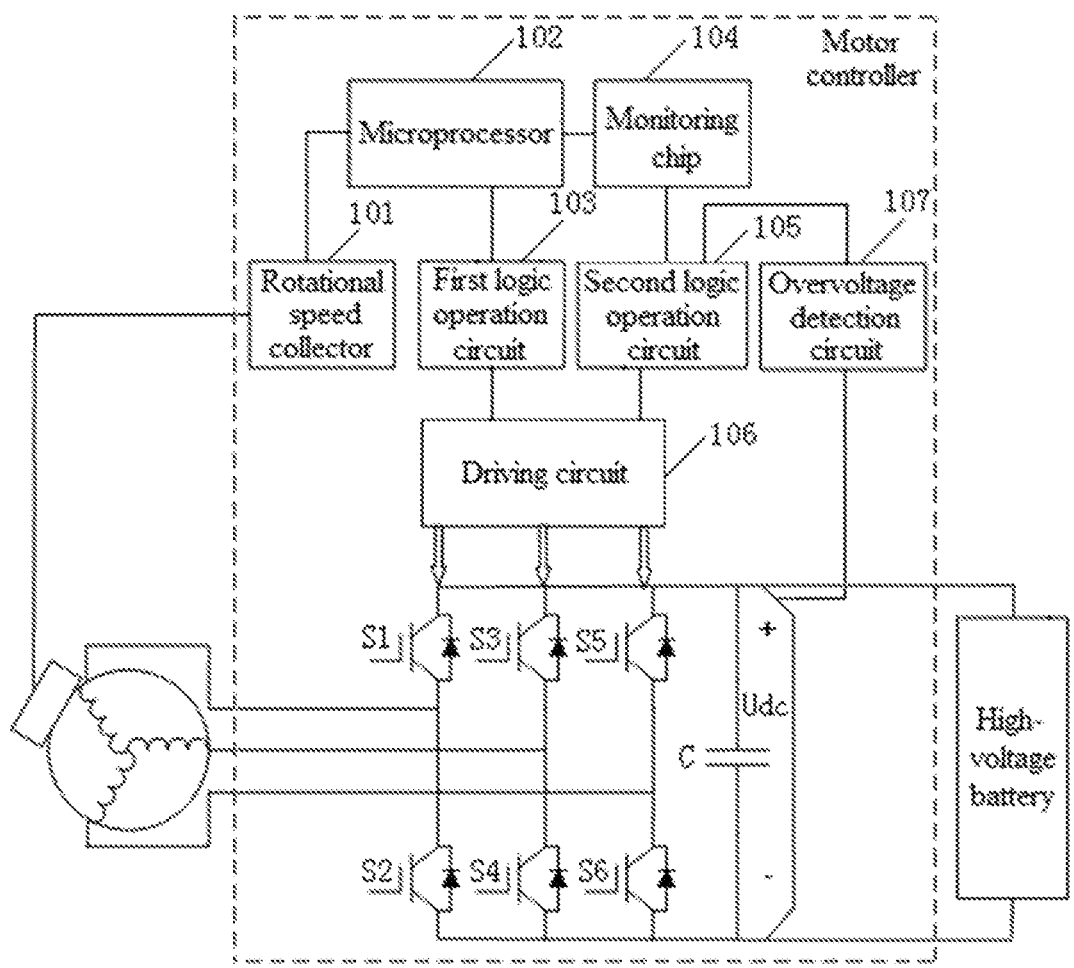
FIG. 1 is a structural schematic view of a motor controller according to an embodiment of the present disclosure.

As illustrated in FIG. 1, the motor controller includes a main circuit (including upper transistors S1, S3 and S5, lower transistors S2, S4 and S6 and DC bus capacitor C which are illustrated in FIG. 1), a rotational speed collector 101, a microprocessor 102, a monitoring chip 104, a first logic operation circuit 103, a second logic operation circuit 105, a driving circuit 106 and an overvoltage detection circuit 107.

The microprocessor 102 is configured to output an initial pulse width modulation (PWM) signal and a first shutoff signal, and generate a rotational speed determination signal based on a motor speed signal outputted by the rotational speed collector 101.

The first logic operation circuit 103 is configured to generate a first control signal based on the initial PWM signal, the first shutoff signal and the rotational speed determination signal.

The monitoring chip 104 is configured to monitor a working state of the microprocessor 102, and generate and output a second shutoff signal based on the working state or an output instruction of the microprocessor.

The second logic operation circuit 105 is configured to generate a second control signal based on the second shutoff signal and a DC bus overvoltage signal of the main circuit outputted by the overvoltage detection circuit 107.

The driving circuit 106 is configured to control the main circuit to work normally or enter one of a first safety state and a second safety state in response to the first control signal, and control the main circuit to stop receiving the first control signal and enter one of the first safety state and the second safety state in response to the second control signal.

In a normal situation, the microprocessor 102 obtains the rotational speed determination signal of the motor based on the motor speed signal outputted by the rotational speed collector 101, and then the first logic operation circuit 103 generates and outputs the first control signal based on the speed of the motor indicated by the rotational speed determination signal in combination with the initial PWM signal and the first shutoff signal outputted by the microprocessor 102, to make the driving circuit 106 control the main circuit to work normally or enter one of the first safety state and the second safety state, so as to realize a first shutoff path.

In an embodiment, when the speed of the motor is indicated by the rotational speed signal as a low speed, which means a counter-electromotive force of the motor is lower than a DC bus voltage Udc, the bridge arms are all shutoff state in which the six switch transistors S1 to S6 of the main circuit are all shutoff can ensure a zero current of the motor, which is an ideal safety state. Therefore, at this time, the first control signal controls the main circuit to enter the bridge arms all shutoff state. However, when the speed of the motor is indicated by the rotational speed signal as a high speed, which means the counter-electromotive force of the motor is higher than the DC bus voltage Udc, the motor is working in a power generation state, and the current flows into the DC bus capacitor C and a high-voltage battery through an anti-parallel diode of the switch transistors. If the high voltage battery cannot be disconnected at this time, the motor will generate an uncontrollable reverse braking torque, which violates the safety goal. Therefore, at this time, the first control signal controls the main circuit to enter the safety state of the active short circuit state in which the upper transistors S1, S3, S5 (or the lower transistors S2, S4, S6) in the main circuit are all shut off, and the lower transistors S2, S4, S6 (or upper transistors S1, S3, S5) will be all turned on to short a three-phase stator winding of the motor. At this time, an induced electromotive force generated by rotation of the motor generates a current in the winding of the motor, but the current flows through the three lower transistors that are turned on, and will not flow to the high-voltage battery and the DC bus capacitor C, which only produces a very small braking torque, thus ensuring safety.

In an embodiment, the first control signal is a PWM adjustment signal obtained by adding the safety state to the initial PWM signal, and an essence of the first control signal is to control the switching transistors in the main circuit by PWM.

In addition, when the microprocessor 102 is in a fault state or its output instruction to the monitoring chip 104 is a shutoff instruction, the monitoring chip 104 outputs the second shutoff signal in time. Then the second logic operation circuit 105 outputs the second control signal based on the second shutoff signal and whether the DC bus voltage Udc of the main circuit is in an overvoltage state, to make the driving circuit 106 control the main circuit to stop receiving the first control signal and enter the safety state, so as to realize a second shutoff path.

In an embodiment, the second control signal includes an enable signal and a state selection signal. The second logic operation circuit 105 generates the enable signal based on the second shutoff signal to control the main circuit to stop receiving the first control signal, and generates the state selection signal based on the DC bus overvoltage signal to control the main circuit to enter the safety state. If the DC bus overvoltage signal indicates that a DC bus of the main circuit is in an overvoltage state, the state selection signal is used to control the main circuit to enter the safety state of the active short circuit state, and if the DC bus overvoltage signal indicates that the DC bus of the main circuit is in a non-overvoltage state, the state selection signal is used to control the main circuit to enter the safety state of the bridge arms all shutoff state.

The motor controller according to the embodiments of the present disclosure can enter the safety states by the above two independent shutoff paths. The design of the two shutoff paths can achieve safety level decomposition, which reduces the safety level requirement on each shutoff path, thereby reducing the difficulty in designing a device.

It should be noted that the monitoring chip 104 in the embodiment of the present disclosure may be the same as the system monitoring chip used in the conventional technology, such as a TLF35584 SBC chip of Infineon, or chips of TI, NXP or other company, which is not limited herein and can be chosen depending on an application environment, all falling in the scope of protection of the present disclosure. The above chips monitor the microprocessor 102 through a hardwire and a SPI (Serial Peripheral Interface) watchdog, and output the second shutoff signal when detecting the microprocessor 102 as in a fault state or receiving the shutoff instruction.

Figure 2:
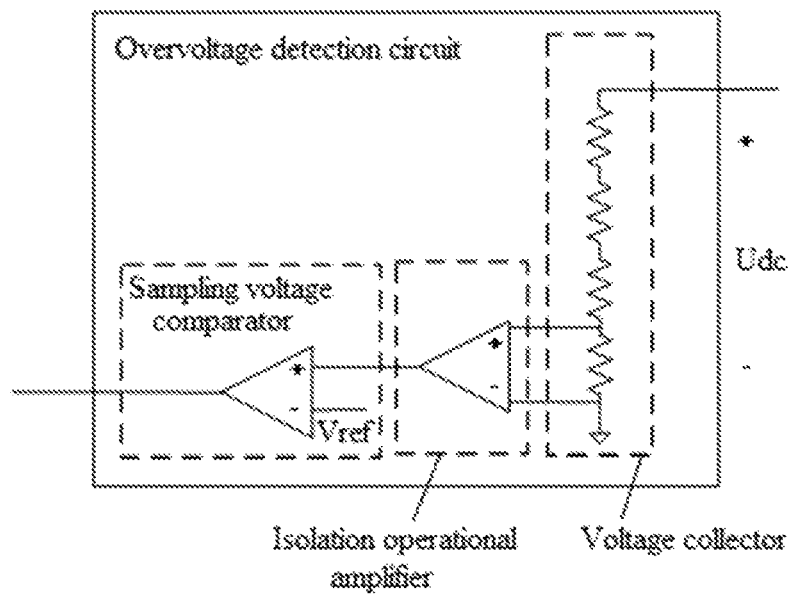
FIG. 2 is a circuit schematic view of an overvoltage detection circuit according to an embodiment of the present disclosure.

In an embodiment, the overvoltage detection circuit 107 includes a voltage collector, an isolation operational amplifier and a sampling voltage comparator, as illustrated in FIG. 2. The voltage collector acquires the DC bus voltage Udc through a voltage divider resistor, which is then isolated and compared with a reference voltage Vref set by a hardware. If the acquired voltage value is greater than the reference voltage Vref, the DC bus overvoltage signal outputted by the sampling voltage comparator indicates that the DC bus of the main circuit is in an overvoltage state (i.e., the DC bus voltage Udc is overhigh), and if the acquired voltage value is less than the reference voltage Vref, the DC bus overvoltage signal outputted by the sampling voltage comparator indicates that the DC bus of the main circuit is in a non-overvoltage state (i.e., the DC bus voltage Udc is normal).

Since the motor controller of the conventional technology is normally provided with the overvoltage detection circuit even in the case of no functional safety requirement, the original overvoltage detection circuit is just reused in the embodiment of the present disclosure, without bringing an additional hardware cost.

In an embodiment, an input end of the rotational speed collector 101 is connected to an output end of a motor speed sensor.

The motor speed sensor is an existing device of pure electric or hybrid vehicles in the conventional technology, and therefore no extra hardware cost is required in the embodiment.

From the above, no additional hardware circuit is added by the embodiment of the present disclosure. Meanwhile, the motor controller can enter the safety states via the above two independent shutoff paths. The design of the two shutoff paths can achieve safety level decomposition, which reduces the safety level requirement on each shutoff path, thereby reducing difficulty in designing the device.

Figure 3:
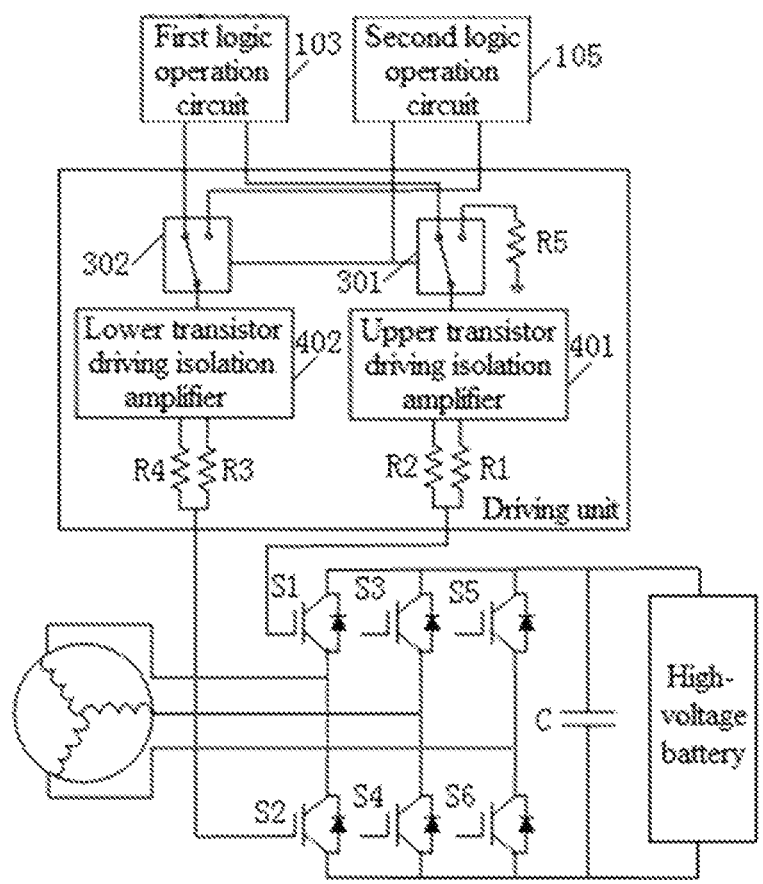
FIG. 3 is a structural schematic view of a driving unit and its input and output connections according to an embodiment of the present disclosure.

A motor controller is provided in another embodiment of the present disclosure, on the basis of the above embodiment as shown in FIG. 1 and FIG. 2. The driving circuit 106 includes three driving units. As illustrated in FIG. 3, each driving unit includes: an upper transistor selection switch 301, a lower transistor selection switch 302, an upper transistor driving sub-circuit and a lower transistor driving sub-circuit.

A control end of the upper transistor selection switch 301 and a control end of the lower transistor selection switch 302 both receive the enable signal.

A fixed contact of the upper transistor selection switch 301 is connected to an input end of the upper transistor driving sub-circuit. A fixed contact of the lower transistor selection switch 302 is connected to an input end of the lower transistor driving sub-circuit.

A normally closed contact of the upper transistor selection switch 301 receives an upper transistor modulation signal in the first control signal. A normally closed contact of the lower transistor selection switch 302 receives a lower transistor modulation signal in the first control signal.

A normally open contact of the upper transistor selection switch 301 receives a grounded signal. A normally open contact of the lower transistor selection switch 302 receives the state selection signal.

An output end of the upper transistor driving sub-circuit is connected to an upper transistor control end in the main circuit. An output end of the lower transistor driving sub-circuit is connected to a lower transistor control end in the main circuit.

In an embodiment, as illustrated in FIG. 3, the upper transistor driving sub-circuit includes an upper transistor driving isolation amplifier 401, a first resistor R1 and a second resistor R2.

An input end of the upper transistor driving isolation amplifier 401 is an input end of the upper transistor driving sub-circuit. An output end of the upper transistor driving isolation amplifier 401 is connected to one end of the first resistor R1 and one end of the second resistor R2. The other end of the first resistor R1 is connected to the other end of the second resistor R2 at a connection point which serves as the output end of the upper transistor driving sub-circuit.

As illustrated in FIG. 3, the lower transistor driving sub-circuit includes a lower transistor driving isolation amplifier 402, a third resistor R3 and a fourth resistor R4.

An input end of the lower transistor driving isolation amplifier 402 is the input end of the lower transistor driving sub-circuit. An output end of the lower transistor driving isolation amplifier 402 is connected to one end of the third resistor R3 and one end of the fourth resistor R4. The other end of the third resistor R3 is connected to the other end of the fourth resistor R4 at a connection point which serves as the output end of the lower transistor driving sub-circuit.

In an embodiment, as illustrated in FIG. 3, the grounded signal is received from one end of a fifth resistor R5, where the other end of the fifth resistor R5 is grounded.

As illustrated in FIG. 3, since drive structures for the three phases are the same, the drive structure for one phase (a phase driven by the bridge arm consisting of S1 and S2) is described in the followings.

As illustrated in FIG. 3, the upper transistor selection switch 301 and the lower transistor selection switch 105 are both two-to-one selection switches. When the enable signal (which may be a high level) outputted by the second logic operation circuit 105 represents that the shutoff is not to be performed by the second shutoff path, the poles of the upper transistor selection switch 301 and the lower transistor selection switch 302 are both deflected to the left side to be connected with the normally closed contacts. Inputs of the upper transistor driving isolation amplifier 401 and the lower transistor driving isolation amplifier 402 are PWM adjustment signals, and control, after being isolated and amplified, the corresponding switching transistors (S1 or S2) to be turned on or turned off. Principles for the other two phases are the same as the above, which are not repeated herein. In this way, the main circuit can work normally or enter a safety state.

If the enable signal (which may be a low level) outputted by the second logic operation circuit 105 represents that the shutoff is to be performed by the second shutoff path, the poles of the upper transistor selection switch 301 and the lower transistor selection switch 302 are both deflected to the right side to be connected with the normally open contacts. At this time, the input of the upper transistor driving isolation amplifier 401 is the grounded signal. An output (which may be a low level) of the upper transistor driving isolation amplifier 401 controls, after being isolated and amplified, all the three upper transistors (S1, S3 and S5) to be turned off. The input of the lower transistor driving isolation amplifier 402 is the state selection signal. When the DC bus overvoltage signal indicates that the DC bus of the main circuit is in an overvoltage state, the state selection signal (which may be a high level) controls, after being isolated and amplified, all the three lower transistors (S2, S4 and S6) to be turned on, to make the main circuit enter the safety state of the active short circuit state. If the DC bus overvoltage signal indicates that the DC bus of the main circuit is in a non-overvoltage state, the state selection signal (which may be a low level) controls, after being isolated and amplified, all the three lower transistors (S2, S4 and S6) to be turned off, to make the main circuit enter the safety state of the bridge arms all shutoff state.

Other principles of the embodiment are the same as that of the above embodiment, which are not repeated here.

It should be noted that the embodiments in this specification are all described in a progressive manner. Description of each of the embodiments focuses on differences from other embodiments, and reference may be made to each other for the same or similar parts among respective embodiments.

The above is only description of preferred embodiments of the present disclosure and is not intended to limit the present disclosure in any form. Those skilled in the art can make many possible variations and modifications to the technical solutions of the present disclosure by using the methods and technical contents disclosed above, or modify the embodiments to equivalent embodiments with equivalent changes without deviating from the scope of the technical solutions of the present disclosure. Therefore, any simple amendments, equivalent changes, and modifications made to the above embodiments in accordance with the technical essence of the present disclosure, without deviating from the scope of the technical solutions of the present disclosure, are all within the scope of the technical solutions of the present disclosure.

The invention claimed is:

1. A motor controller, comprising: a main circuit, a rotational speed collector, a microprocessor, a monitoring chip, a first logic operation circuit, a second logic operation circuit, an overvoltage detection circuit and a driving circuit, wherein the microprocessor is configured to output an initial pulse width modulation (PWM) signal and a first shutoff signal, and generate a rotational speed determination signal based on a motor rotational speed signal outputted by the rotational speed collector;

the first logic operation circuit is configured to generate a first control signal based on the initial PWM signal, the first shutoff signal and the rotational speed determination signal;

the monitoring chip is configured to monitor a working state of the microprocessor, and generate and output a second shutoff signal based on the working state or an output instruction of the microprocessor;

the second logic operation circuit is configured to generate a second control signal based on the second shutoff signal and a direct current (DC) bus overvoltage signal of the main circuit outputted by the overvoltage detection circuit; and the driving circuit is configured to control the main circuit to work normally or enter one of a first safety state and a second safety state in response to the first control signal, and control the main circuit to stop receiving the first control signal and enter one of the first safety state and the second safety state in response to the second control signal.

2. The motor controller according to claim 1, wherein the second control signal comprises an enable signal and a state selection signal, wherein the enable signal is used to control the main circuit to stop receiving the first control signal; and the state selection signal is used to control the main circuit to enter one of the first safety state and the second safety state.

3. The motor controller according to claim 2, wherein the second logic operation circuit is configured to:

generate the enable signal based on the second shutoff signal; and generate the state selection signal based on the DC bus overvoltage signal, wherein, if the DC bus overvoltage signal indicates that a DC bus of the main circuit is in an overvoltage state, the state selection signal is used to control the main circuit to enter the first safety state; if the DC bus overvoltage signal indicates that the DC bus of the main circuit is in a non-overvoltage state, the state selection signal is used to control the main circuit to enter the second safety state, wherein the first safety state is an active short circuit state, and the second safety state is a bridge arms all shutoff state.

4. The motor controller according to claim 2, wherein, the driving circuit comprises three driving units, each of the driving units comprises: an upper transistor selection switch, a lower transistor selection switch, an upper transistor driving sub-circuit and a lower transistor driving sub-circuit, wherein, a control end of the upper transistor selection switch and a control end of the lower transistor selection switch both receive the enable signal;

a fixed contact of the upper transistor selection switch is connected to an input end of the upper transistor driving sub-circuit;

a fixed contact of the lower transistor selection switch is connected to an input end of the lower transistor driving sub-circuit;

a normally closed contact of the upper transistor selection switch receives an upper transistor modulation signal in the first control signal;

a normally closed contact of the lower transistor selection switch receives a lower transistor modulation signal in the first control signal;

a normally open contact of the upper transistor selection switch receives a grounded signal;

a normally open contact of the lower transistor selection switch receives the state selection signal;

an output end of the upper transistor driving sub-circuit is connected to a upper transistor control end in the main circuit; and an output end of the lower transistor driving sub-circuit is connected to a lower transistor control end in the main circuit.

5. The motor controller according to claim 4, wherein, the upper transistor driving sub-circuit comprises: an upper transistor driving isolation amplifier, a first resistor and a second resistor, wherein, an input end of the upper transistor driving isolation amplifier is an input end of the upper transistor driving sub-circuit;

an output end of the upper transistor driving isolation amplifier is connected to one end of the first resistor and one end of the second resistor; and the other end of the first resistor is connected to the other end of the second resistor at a connection point which serves as the output end of the upper transistor driving sub-circuit.

6. The motor controller according to claim 4, wherein, the lower transistor driving sub-circuit comprises: a lower transistor driving isolation amplifier, a third resistor and a fourth resistor, wherein an input end of the lower transistor driving isolation amplifier is the input end of the lower transistor driving sub-circuit;

an output end of the lower transistor driving isolation amplifier is connected to one end of the third resistor and one end of the fourth resistor; and the other end of the third resistor is connected to the other end of the fourth resistor at a connection point which serves as the output end of the lower transistor driving sub-circuit.

7. The motor controller according to claim 4, wherein the grounded signal is received from one end of a fifth resistor, the other end of the fifth resistor is grounded.

8. The motor controller according to claim 1, wherein the monitoring chip is configured to:

generate and output the second shutoff signal when the working state of the microprocessor is a fault state, or the output instruction of the microprocessor is a shutoff instruction.

9. The motor controller according to claim 1, wherein an input end of the rotational speed collector is connected to an output end of a motor speed sensor.

10. The motor controller according to claim 1, wherein the overvoltage detection circuit comprises: a voltage collector, an isolation operational amplifier and a sampling voltage comparator, wherein an input end of the voltage collector is connected to two ends of a DC bus capacitor in the main circuit;

an output end of the voltage collector is connected to an input end of the isolation operational amplification;

an output end of the isolation operational amplifier is connected to a non-inverting input end of the sampling voltage comparator;

an inverting input end of the sampling voltage comparator receives a reference voltage; and an output end of the sampling voltage comparator outputs the DC bus overvoltage signal.

\* \* \* \* \*